United States Patent [19]

Schneider et al.

[11] Patent Number: 5,051,580

[45] Date of Patent: Sep. 24, 1991

[54] NEUTRAL PARTICLE BEAM VELOCITY VECTOR SENSING SYSTEM

[75] Inventors: Stanley Schneider, Rancho Palos Verdes; Theodore D. Fay, Mission Viejo, both of Calif.

[73] Assignee: McDonnell Douglas Corporation, Long Beach, Calif.

[21] Appl. No.: 557,412

[22] Filed: Jul. 23, 1990

[51] Int. Cl.⁵ .......................... H01S 1/00; H01S 3/00; H05H 3/02
[52] U.S. Cl. .................................. 250/251; 250/491.1
[58] Field of Search ................... 250/251, 492.1, 491.1

[56] References Cited

U.S. PATENT DOCUMENTS

| | | | |
|---|---|---|---|
| 4,700,068 | 10/1987 | McClung et al. | 250/251 |
| 4,701,616 | 10/1987 | West et al. | 250/251 |
| 4,762,993 | 8/1988 | Moses | 250/251 |
| 4,874,942 | 10/1989 | Clauser | 250/251 |

Primary Examiner—Bruce C. Anderson
Attorney, Agent, or Firm—Gregory A. Cone; John P. Scholl

[57] ABSTRACT

Velocity vector components of a relativistic high energy beam of atomic particles are measured by examination of the Doppler shifts of spontaneous photo emissions from the beam. Beam direction can be calculated directly from measurements made at the Doppler-free angle if beam velocity is known. Beam velocity can be calculated from measurements made at the Doppler free angle or at other convenient angles. A beam steering technique by nulling outputs from diametrically opposed sensors is also disclosed.

20 Claims, 3 Drawing Sheets

NEUTRAL PARTICLE BEAM VELOCITY VECTOR SENSING SYSTEM

BACKGROUND OF THE INVENTION

This invention relates to high energy relativistic beams. More particularly it is related to systems and methods for sensing the direction and velocity of neutral particle beams. Still more particularly, this invention relates to a system and method which utilizes the Doppler shift in the wavelengths of the emissions from the high energy atoms in the beam. It also relates to beam steering methods utilizing such information.

A neutral particle beam has the advantage that it exhibits straight line propagation in a vacuum completely independent of the distortions and deflections that would be induced by local electric and magnetic fields in an electrically charged particle beam. Such neutral beams have a variety of applications. Conventional radars and lasers are normally limited to having only surface effects on objects, but neutral particle beams are capable of penetrating and probing deeply into the body mass of the object and be hence used for object identification and discriminate between similar looking objects. Potential commercial and scientific applications include heating targets for controlled fusion and developing a neutral particle beam microscope. The microscope will not be subject to the limitations of the electric and magnetic distortions inevitably present in the electromagnetic lenses of scanning ion and electron microscopes. Theoretically the neutral particle beam microscope could operate with much high resolution and depth of penetration.

The promise of the neutral particle beam cannot be realized, however, until the direction of the beam can be precisely sensed and controlled. Indeed precise practical beam sensing methods must precede the achievement of precise beam scanning techniques. Several methods of sensing the direction of a neutral particle beam have been proposed, but all of them suffer from one or more serious difficulties. Proposed methods have included pinhole, shadow wire, laser resonance fluorescence, and other less well defined concepts. Both the pinhole and shadow wire methods are inherently intrusive and may present difficulties when high currents and quasi continuous beam operations are involved.

Non-intrusive or non-beam interrupting methods use photons or electrons to sense the beam. One method is laser resonance fluorescence. There are many laser resonance fluorescence (LRF) variations, but all involve the insertion of laser light into the beam at a special angle (the magic angle) to detect the photon fluorescence (or the ionization electrons) emitted by the interaction of laser photons and beam atoms. The magic angle is defined as $\cos \theta = \beta$ in the Doppler formula set forth below (formula one).

The laser fluorescence method is extremely sensitive to the direction of the beam relative to the laser light direction reference. Unfortunately, most detection schemes must observe this fluorescence in the presence of a stronger background due to the spontaneous photo emission of excited neutral hydrogen atoms. These atoms emit at the same frequency band as the relaxation fluorescence induced by the laser light.

SUMMARY OF THE INVENTION

The passive Doppler method that forms the basis if this invention uses this large number of spontaneous emission photons instead of the laser fluorescence signal to sense the beam. In this approach the noise to be overcome by the LRF technique becomes the signal used to perform the direction sensing. Also this technique is passive and does not require the use of the two excitation lasers whose output must be both tunable and very stable for the LRF technique. The spontaneous emission observed at a given angle has a frequency/wavelength shift due to the Doppler effect. The magnitude of the frequency/wavelength shift is simply related to the angle between the observer and the beam through the relativistic Doppler equation given in equation one below.

The deviation of wavelength with respect to speed, $\beta = v/c$, is a maximum if the photo emission is sensed parallel and anti-parallel to the beam and can be used to measure the speed of the beam particles. The derivative of the wavelength with respect to the beam speed is zero at the Doppler free angle (magic angle) where $\cos \theta_m = \beta$. Sensing at or near this angle leads to maximum sensitivity for measuring the beam direction for a beam with significant beam velocity spread. Furthermore, by observing photo emission from four diametrically opposed locations on each side of the beam, the observer can sense when the beam's centroid direction is precisely lined up at an angle $\theta_m = \arccos \beta$ to the observation line. The nulling of the two signals allows for precise measurement of where the beam centroid is located with respect to a known optical axis. The use of nulling permits systematic wavelength shifts to be cancelled. Thus, the nulling technique can potentially sense the beam direction, $\theta$, to within one microradian or less, provided average $\beta$, $\gamma$ and $\lambda_b$ are accurately known where $\lambda_b$ is the centroid of the wavelength data seen at detector at $\theta_m$, $\gamma$ is a well known function of $\beta$, namely $\gamma = \sqrt{1 - \beta^2}$. Wavelength measurements in the forward direction (theta approaches zero) and near the laboratory magic angle ($\cos \theta_m = \beta$) can determine $\beta$ and $\gamma$ precisely. Measurements at any $\theta$ can be used to determine $\beta$, $\gamma$ except at $\theta = \theta_m$. They are best done at $\theta = 0$ or $\pi$. At the magic angle, the variation of $\lambda$ with $\beta$ is zero in the first order. This angle is also Called the Doppler free angle because the observed wavelength shifts are insensitive to beam energy. Beam direction can be sensed by measuring the wavelength shift of the photo emission from any excited state. The strongest lines of hydrogen appear in the ultraviolet (above 10 eV) and the visible (1-2 eV). The ultraviolet lines are called Lyman $\alpha$, Lyman $\beta$, etc., in order of decreasing strengths and wavelengths, visible lines are designated as Balmer $\alpha$, Balmer $\beta$, etc., in the same order.

The technique can also be employed in a staring, rather than a nulling, sensor embodiment. Here, the beam direction is measured directly by correlation of the displacement across the detector of the beam emissions collected from four different solid angles relative to the beam, all with a polar angle $\theta$ equal to the magic angle but with four different angles $\phi$ about the beam axis. For convenience, one could choose the four $\phi$ values 90 degrees apart. Velocity information is easily determined by this technique as well, but with the polar angle $\theta$ used is not equal to the magic angle for this measurement.

Whichever technique is used, the basic components of the sensor are the same. There are four main subassemblies: The collector optics, the photo emission input control means, the wavelength measurement means, and the detector means. The collector optics are configured to gather the emitted photons. Most commonly they are mirrors and lenses. The input control means act to precisely control and limit the angular acceptance of photo emission by the sensor. Normally a single or multiple slit (Ronchi ruling) is used. The purpose here is to exclude photons which are not relevant to direction or velocity measurements. Active angular masks implemented as liquid crystal light valves, acousto-optic and electro-optic filters, active dispersive masks, Fabry-Perot and Michelson interferometers could be also used here.

The wavelength measurement means separate and expand the photons into measurable spectral lines. To make absolute measurements the lines must be measured at four different solid angles, done at or about the Doppler free (magic) polar angle and four normal angles in the place perpendicular to the beam axis. Relative or nulling measurements can be done at any convenient angle, although they are best done centered at the Doppler free angle. Fabry-Perot, Michelson, grating, Michelson/grating, molecular bath, and laser stabilized means can be used. The detector senses the movement of the position of the spectral lines. The amount of the movement is mathematically related to the direction and velocity of the beam. This information can also be used to change the direction and speed of the beam by appropriate messages to the beam steering magnets and accelerators, respectively.

The mathematical calculations are best done by a computer. Once the very broad image of the Doppler shifted is recorded in a digital map made from the output of the pixel array in the detector, a fit is made to a first mathematical model while subtracting out the noise from higher energy particles such as X-rays, gamma rays and neutrons also emitted from the beam, from the recorded image. The model parameters are then varied by the computer to achieve the best fit to the recorded image. The beam angle and speed for the best fit model (least squares method works well) are then adopted as the values for the beam if they are within accepted limits for statistical accuracy.

DETAILED DESCRIPTION OF THE INVENTION

Figure 1:
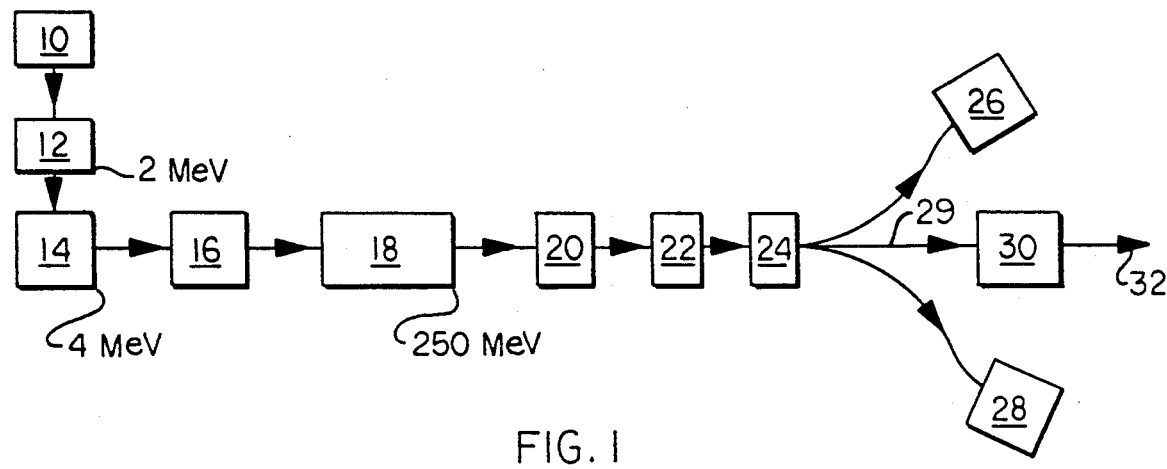
FIG. 1 is a block schematic view of these functional elements of a typical neutral particle beam line.

It is to be understood, of course, that the discussion below is concerned with a specific embodiment of the invention, in particular a neutral particle beam employing hydrogen atoms sensed at or about the magic angle relative to the chamber center line. Numerous variations on the basic theme can be constructed which differ from the specific embodiment. The true scope of the invention is to be defined by the appended claims. The specific discussion of the invention best begins with a development of the mathematics which describe the Doppler shift in the wavelength and the sensing angles utilized.

The wavelength, $\lambda$, observed at an angle $\theta$ in the laboratory frame (between the beam particle emitter and the direction of the observation) is given by the special relativistic Doppler formula $$\lambda = \lambda_b (1 - \beta \cos\theta)\gamma \tag{1}$$

where $\lambda_b$ is the emitted wavelength at rest with the moving particle (i.e., it is the emission spectral wavelength for an emitter at rest). $\beta = v/c$ with v the particle velocity, c the velocity of light, and $\gamma = (1-\beta^2)^{-\frac{1}{2}}$. If $\theta_b$ denotes the angle at rest with the moving emitting particle corresponding to the observation at $\theta$ in the laboratory frame, one has the relationships:

$$\tan\theta_b = \frac{\sin\theta}{\gamma(\cos\theta - \beta)} \tag{2a}$$

$$\lambda_b = \lambda(1 + \beta\cos\theta_b)\gamma \tag{2b}$$

and $$\tan\theta = \frac{\sin\theta_b}{\gamma(\cos\theta + \beta)} \tag{2c}$$

To use the hydrogen spectral lines to determine angle, the spectral lines must be narrow enough. The $\Delta\lambda/\lambda$ values for the Lyman $\alpha$, Lyman $\beta$, Balmer $\alpha$ lines are much smaller than $10^{-6}$ so they are potentially useful to obtain a beam centroid direction sensing of 1 $\mu$rad or less. To study the sensitivities of the observed wavelengths with angular and velocity variations, equation (1) is expanded about nominal $\theta = \theta_o$, $\beta = \beta_o$ values in a Taylor series:

$$\lambda(\theta,\beta) = \lambda_b \left[ 1 - \beta_o \cos\theta_o \gamma_o + (\beta_o - \cos\theta_o)\gamma_o^3(\beta - \beta_o) + \gamma_o \beta_o(\theta - \theta_o)\sin\theta_o + \gamma_o^3(\theta - \theta_o)(\beta - \beta_o)\sin\theta_o + \gamma_o^5(1 - 3\beta_o \cos\theta_o + 2\beta^2)\frac{(\beta - \beta_o)^2}{2} - \gamma_o\beta_o\frac{(\theta - \theta_o)^2 \cos\theta_o}{2} + \right] \tag{3}$$

There are special angles worth noting: The first of which is $\theta_o = \arccos(\beta) = \arcsin(1/\gamma) = \arctan(1/\beta\gamma)$.

Here, $\lambda = \lambda_b/\gamma$, the laboratory observed wavelength is blue shifted by a factor $1/\gamma$. Note, $\theta_b$ equals $\pi/2$ in the beam frame corresponds to $\theta = \arccos(\beta)$ in the lab frame. The quantity $\lambda/\beta = \gamma_b(\beta - \cos\theta)\gamma^3$ vanishes at this "magic angle." That is, the observed wavelength is insensitive to first-order changes in $\beta$. See below for the discussion of the effect of sound-order changes in $\beta$. The wavelength expansion about the magic angle is obtained from the equation (3) using $\theta_o = \theta_M = \arccos(\beta) = \arcsin(1/\gamma)$. This special angle is known from laser resonance fluorescence investigations and is commonly called the Dopper velocity free angle. It is desirable to have the potential to measure aim angle ultimately to microradian accuracies. From equation (3), one has for $\theta_o = \theta_M$:

$$\lambda(\theta,\beta) = \lambda_b \left( 1/\gamma_o + \beta_o(\theta \cdot \theta_M) + \gamma_o^2(\theta - \theta_M)(\beta - \beta_o) + \right. \tag{4}$$

$$\gamma_o{}^3 \frac{(\beta - \beta_o)2}{2} - \gamma_o\beta_o{}^2 \frac{(\theta - \theta_m)2}{2} + \Big\}$$

If one average equation (4) over a distribution of particles with mean value $\theta = \theta_t$ and $\beta = \beta_t$ and with RMS beam spreads of angle and velocity $(\Delta\beta^2)^{\frac{1}{2}}$ and $(\Delta\theta^2)^{\frac{1}{2}}$ one has for the centroid wavelength of the observed spectral data $$\lambda = \lambda_b \Big( \frac{1}{\lambda_o} + \beta_o(\theta - \theta_M) + \gamma_o{}^2(\theta_t - \theta_M)(\beta_t - \beta_o) - \\ \gamma_o{}^3 \frac{(\beta_t - \beta_o)^2}{2} + \gamma_o{}^3 \frac{(\Delta\beta^2)}{2} - \\ \gamma_o\beta_o{}^2 \frac{(\theta_t - \theta_m)^2}{2} - \gamma_o \frac{\beta_o{}^2(\Delta\theta^2)}{2} - \Big\} \quad (5)$$

If the magic angle is set by a guess value of $\beta = \beta_o$ and there is a shot to shot variation of $\beta = \beta_t$ of $10^{-3}$ to $10^{-4}$ and a beam $\beta$ spread of $(\Delta\beta^2)^{\frac{1}{2}}$ of $10^{-3}$ and an angular spread of $(\Delta\beta^2)^{\frac{1}{2}}$ of $10^{-6}$, one sees from equation (5) that the third term restricts the accuracy of $\Delta\theta/\theta$ to be at best $\gamma_o{}^2(\beta_t - \beta_o/(1/\gamma_o)) \approx \gamma_o{}^3(\beta_t - \beta_o)$ or $10^{-3}$ to $10^{-4}$. If the $\theta$ range (field of view) is $\approx \frac{1}{2}$ degrees (1/114 rad), the ultimate aiming accuracy is $10^{-5}$ to $10^{-6}$ radians depending on the $\beta$ pulse-to-pulse variation. If $\beta = \beta_t$ is known by measurement and the $\theta_M$ angle set equal to arc cos $(\beta_t)$; i.e. $\beta_t = \beta_o$ then the third term vanishes and $\theta_t$ can be determined in terms of the measured $\lambda$ from the data and the solution of the quadratic equation $$-\gamma_t\beta_t \frac{(\theta_t - \theta_m)^2}{2} + \beta_t(\theta_t - \theta_m) + \left(\frac{1}{\gamma_t} - \frac{\lambda}{\lambda_b}\right) = 0$$

The residual uncertainties due to the $$\gamma_t{}^3(\Delta\beta^2) - \gamma_t\beta_t{}^2 \frac{(\Delta\theta^2)}{2}$$

terms in equation (5) are at most of order of $10^{-6}$ as is required for 1 μradian aiming accuracy.

Thus, the magic angle can be used to achieve $10^{-6}$ rad $= \Delta\theta$ aiming accuracy provided: (1) the pulse to pulse variation in $\beta$ and/or the scanning angle field of view is modest, or (2) the $\beta$ value is determined in each pulse and the magic angle is adjusted often enough to allow for the required accuracy with no restriction on the field of view scan in $\theta$. The accelerator's beam output, especially the steadiness of the beam parameters in time, will ultimately determined the usefulness of a method employing the dithering of a magnet and the measurement of the beam centroid wavelength scanned at the magic angle to be able to set an aiming angle to a μrad or less precision. This must be decided empirically using the actual accelerators. The magic angles is a very poor setting to determine $\beta$ since $\Delta\lambda/\Delta\beta = 0$ at $\theta = \theta_M$.

Figure 2:
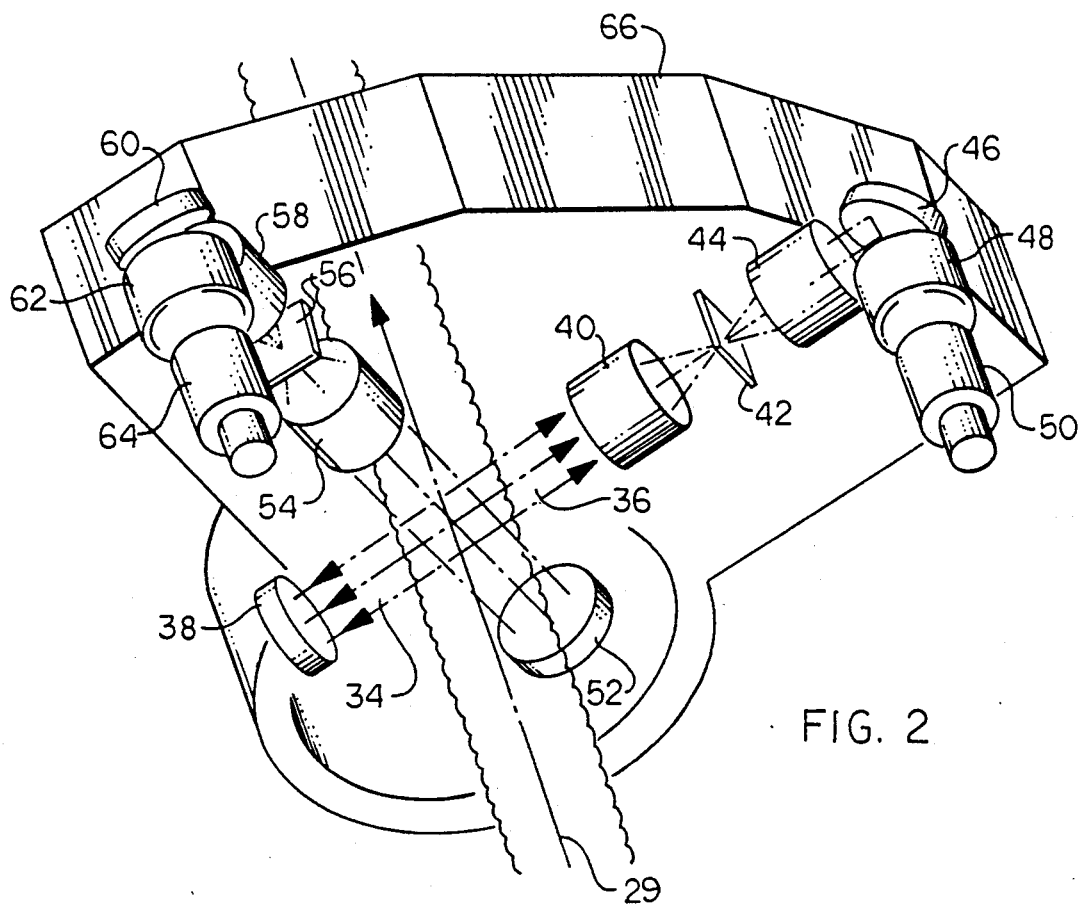
FIG. 2 is an isometric view of two separate beam direction sensors set up at right angles to each other.

We must consider another observation angle to determine $\beta$. For convenience $\theta_o = \pi/2$ is considered. Note that this angle corresponds to the magic angle, $\theta_b = $ arc cos $(-\beta)$ in the moving beam frame. If we place our detectors around the beam (i.e., north, south, east, west) and dither the beam steering field until the spectral line patterns coincide, then the beam's centroid direction is aligned with all the detectors at exactly $\pi/2$ from that direction. There is azimuthal symmetry between beam centroid line and all the detectors. As shown in FIG. 2, the number of detectors required is reduced by use of mirrors. When this nulling of the beam spectral output is obtained, we know that $\theta = \pi/2$ and from equation (1) $\lambda = \lambda_b\gamma$. Measurement of the data pattern's centroid ($\gamma$) allows for determination of $\lambda$ and hence $\beta = (1 - 1/\gamma^2)^{\frac{1}{2}}$. This value is available for use in setting the magic angle. Then additional observations at the magic angle can be used to relate $\theta$ to $\lambda$ as discussed above.

However, it is often easier to use the nulling configuration to actually aim the beam and not to rely on the quantitative relations between the measured wavelength and the aim angle. The nulling can be done at any $\theta_o$ value, for example, the magic angle where $\lambda = \lambda_b/\gamma$ or at $\theta_u = $ arc cos $[(\gamma - 1)/\beta\gamma]$ at which settin9 the centroid wavelength $\lambda = \lambda_b$, that is the spectral lines emitted in the moving frame are unshifted as observed in the laboratory (unshifted angle). We have a choice of working with blue-shifted lines at the magic angle, red-shifted lines at $\theta_o = \pi/2$ or unshifted lines at $\theta_u$ which lies between $\theta_M$ and $\pi/2$. Operationally, the optical assembly would be pointed to the target, by sighting or by computer prediction based on previous sightings and the two sets of steering magnets would be dithered to make the up-down lines coincide as well as the side to side lines. The amount of shift in the measured wavelength, $\lambda$, relative to the emitted wavelength at rest, $\lambda_b$, can be used via equation (1) to calculate the beam velocity since $\theta$ and $\lambda_b$ are known. Use of the magic angle is preferred since if the velocity spread of the beam is large, the spread in the data would then be so large at any other observation angle than the magic angle as to preclude this nulling procedure from being practical.

Referring to FIG. 1, the particular ion source 10 utilized in the specific embodiment was a Culham negative hydrogen volume ion source equipped with a low energy accelerator (100 KeV) and an argon neutralizer. It was manufactured at the Culham Laboratories in England. The beam energy is 100 keV ±10%. The H⁻ current density is 20 mA/cm² with a beam diameter of 8 millimeters. The output from the ion source then passes through a first radio frequency accelerator 12 which pumps the beam up to a 2 MeV energy level. The beam then is conducted into another radio frequency accelerator 14 which doubles the beam energy to 4 MeV. The beam then passes into another radio frequency accelerator 16 and from there into the linear accelerator 18. The beam emerges from the linear accelerator 18 with an energy of 250 MeV. From there the beam enters the area where the beam steering magnets 20 can deflect the negative hydrogen ions based upon the strength of the magnetic fields in the respective magnets. From there the negative hydrogen beam is conducted into a foil neutralizer 22. In the neutralizer a substantial portion of the charged hydrogen atoms are neutralized. From there the beam is passed into the beam separating magnets 24. These put a relatively high charge on the beam such that any positively charged hydrogen atoms are deflected to the H⁺ beam dump 26. Similarly the negatively charged hydrogen atoms are directed to their respective beam dump 28. The remaining atoms in the beam 29 are now exclusively neutral hydrogen atoms. In other systems, the beam may be neutralized by laser photo-detachment, leaving no exited atoms in its output. In such cases, another laser would be used to recite the atoms in the beam. This laser can have relatively broad spectral output and divergence in contrast to the two precision lasers required in the LRF technique. Only at this point is the neutral particle beam conducted into the beam sensing system 30. After passing through the beam direction sensor, the direction of the output beam 32 is accurately known. Deflection of the beam 32 from a desired center line position can be corrected by feeding back suitable correcting voltages to the beam steering magnets 20. In the simplest case, the axis of the detector array is pointed by standard techniques to the desired aiming direction. The beam steering magnets are then varied until the null condition is achieved (e.g. the best coincidence on the detector of the wavelength patterns from the opposite sides of the beam).

FIG. 2 gives a somewhat more detailed look at the components in the beam direction sensor for the nulling embodiment. The neutral particle beam 29 enters the sensor as shown. The beam is sensed by two separate sensors arrayed at right angles to one another. The two sensors are essentially identical and are both mounted securely to the housing 66. The spontaneous emissions of the atoms in the relativistic beam are emitted in all directions from the beam 29. Those sensed by the first sensor go outwardly in the predetermined direction 34 to reflect off of the mirror 38 back through the beam in the predetermined direction 36 to be combined with the photo emissions coming directly from the beam in that direction. This combined emission path is then gathered in the collection optics 40 and then passed through a ruling 42 (also referred to hereinafter as a slit means) into a collimator 44. The light is then reflected off a grating 46 and into a camera 48. The output of the camera is then conducted to an array detector and its associated electronics 50. The second sensor assembly comprises the identical elements 52, 54, 56, 58, 60, 62, and 64 respectively. This particular figure shows the sensing as set up for those emissions that emerge at 90 degrees relative to the chamber center line. Rearrangement can be readily accomplished to sense the emissions at other predetermined angles as will be seen in FIG. 3.

Figure 3:
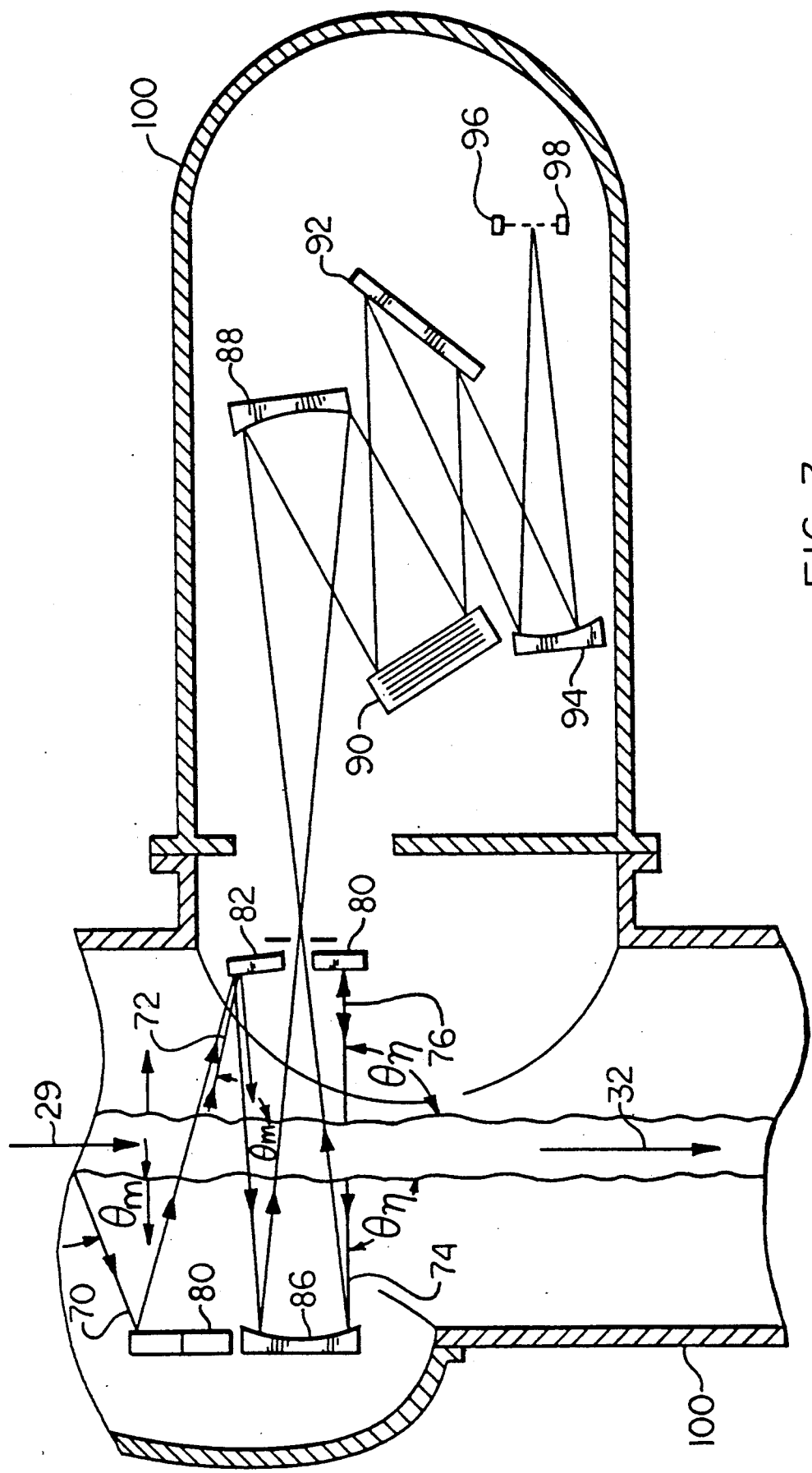
FIG. 3 is a cross sectional view showing in more detail the functional elements in a single beam sensor.
Figure 4:
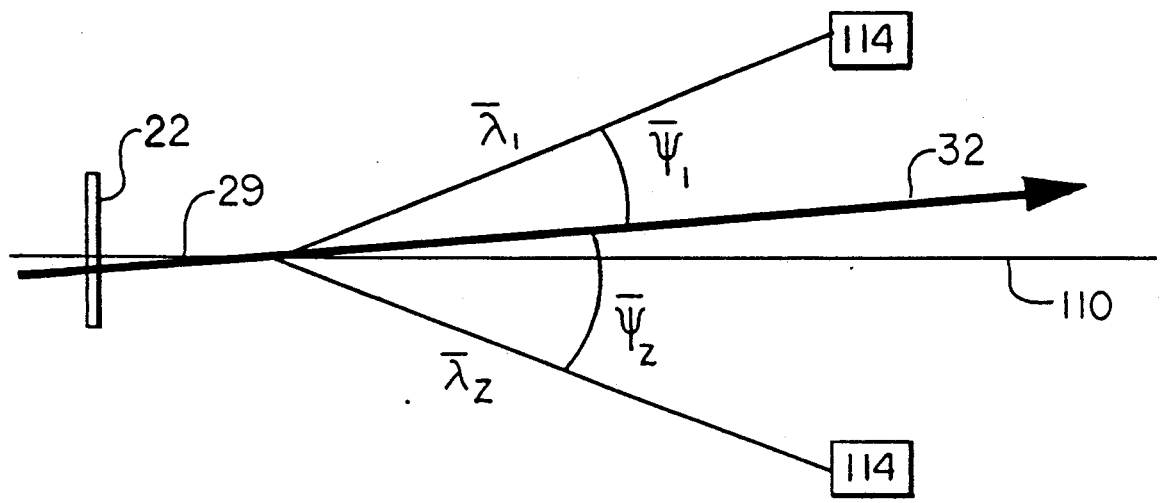
FIG. 4 is a top view of the sensor layout.
Figure 5:
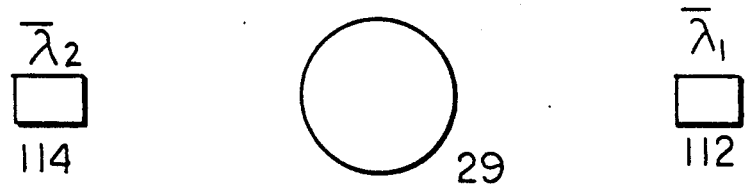
FIG. 5 is an end view of the sensor layout.

FIG. 3 shows a cross sectional view of a particular experimental setup for a single axis beam sensor. It differs from the more general setup shown in FIG. 2 in that the photo emissions can be sensed at both 90 degrees and also at the magic angle relative to the chamber center line. Also the arrangement of the various collection optics has been rearranged and modified. As before, the photo emissions from the neutral particle beam will occur at a variety of angles. Two of them are of interest here for sensing purposes. The first is $\theta_m$, the magic angle. The second is $\theta_n$, the normal angle, 90 degrees. Photo emissions 70 and 72 emerging at $\theta_m$ are collected by the flat mirrors 80 and 82. The normal emissions at $\theta_n$ are collected first by the parabolic mirror 86 and the tilted mirrors 82 and 84. As can be seen from the diagram mirror 82 also retransmits the reflected photo emissions emerging at $\theta_m$ to be combined with the reflected $\theta_n$ emissions as well which then pass through the slit and are gathered at the off access parabaloid 88. From here the combined photo emissions are reflected off of a cross dispersion grating 90 to an echelle 92. The echelle would be provided with means to change its angle to achieve nulling such as a very fine piezoelectric transducer or a microstepper motor and a coarser differential micrometer. From there they are gathered by a camera optic 94 and imaged upon an array detector having a plurality of elements, two of which are shown here as 96 and 98. The plane mirror image will be reflected up towards the element 96 while the parabolic mirror image will be imaged upon element 98.

The preceding discussion deals with a nulling embodiment of the sensing technique. However, there will be applications where the inertia of the mass of the sensors will preclude their use at high repetition rates, normally those greater than 10 per second. In these cases it is necessary to calculate speed and direction directly from the angular deviations as measured by the movement of the spectral lines on the sensors. The precision angular measurements are made at or near the Doppler free angle ($\theta_m$ = arc cos (v/c)) in order to minimize velocity spread effects. Speed can be determined from these measurements and those made at a second convenient angle, typically $\theta_n$ or $\theta_u$ = arc cos $[(\gamma) - 1)/\beta_\gamma]$ at which angle the spectral lines are unshifted from the stationary emission values. Normally two sensors such as those shown in FIG. 3 without the nulling redundancies would be employed in quadrature about the centroid axis of the beam line. As before, once V is determined from measurements taken at either $\theta_n$ or $\theta_u$, $\theta_m$ can be determined for that speed, and the beam direction can be calculated from the shifting of the spectral lines on the sensor from a known position produced when the beam centroid is exactly on $\theta_m$. In a staring sensor of this type, the deviation of the centroid of the beam from the system fiducial is calculated absolutely via the shifts in the observed wavelengths at the sensor from known positions.

The control system direction cosines are determined from the data sensed by the four detectors all placed at a common inclined angle with respect to the beam sensor fiducial axis 0.110. As described above if this angle is taken as $\theta_m = \cos^{-1}(\beta^-)$, the sensing system is made least sensitive to velocity spread ($\beta = v/c$) in the beam. But the algorithms apply at any common inclined angle. The four detectors 112, 114, 116, and 118 have angles here about the fidicual axis 110 at 90 degrees apart, forming a N-S-E-W geometry. If $\lambda_o$ is the centroid of the wavelengths in the distribution in a frame at rest with the beam (known from fundamental atoms physics and $\beta^-$ is the beam centroid velocity measured by the Doppler method by sensors not at $\theta = \theta_m$ or known from other measurements, e.g. measurements of beam velocity of the H$^-$ particles before beam neutralization, $\lambda_1, \lambda_2, \lambda_3, \lambda_4$ are the centroid wavelengths of the data distribution seen by the four detectors 112, 114, 116, and 118 respectively then the steering magnet engineering control quantities are determined by $$W_x = \cos(\alpha_x) = \sin\theta \cos\phi = (\lambda_2 - \lambda_1)/2\lambda_0\beta$$
$$W_y = \cos(\alpha_y) = \sin\theta \sin\phi = (\lambda_3 - \lambda_4)/2\lambda_0\beta$$

$$W_z = \cos(\alpha_z) = \cos\theta = \sqrt{1 - W_x^2 - W_y^2}$$
$$= \sqrt{1 - \left[\frac{(\lambda_2 - \lambda_1)^2 + (\lambda_3 - \lambda_4)^2}{4\lambda_0\beta}\right]}$$

where $\alpha_x$ is the angle between the x axis fiducial and the beam centroid ray $\alpha_y$ is the angle between the y axis fiducial and the beam centroid ray $\alpha_z$ is the angle between the z axis fiducial and the beam centroid ray 29.

What is claimed is:

1. A system for steering the direction of a relativistic neutral particle beam relative to the system fiducial axis comprising:
    means for passively collecting the spectral lines from the spontaneous emissions of photons from excited particles in the beam at a predetermined angle relative to the fiducial axis at diametrically opposite sides of the known beam center line;
    means for combining the collected spectral lines from the opposite sides of the beam onto a sensor such that, if the actual beam center line is coincident with a desired angle referenced to the fiducial axis in the plane defined by the predetermined angles, the combined spectral lines will coincide; and
    means to deflect the beam in the plane if the combined spectral lines do not coincide initially, such that coincidence of the combined spectral lines on the sensor will be achieved thereby indicating coincidence of the actual beam centerline with the desired angle.

2. The system of claim 1 wherein the predetermined angle is the Doppler velocity free angle.

3. The system of claim 2 wherein the neutral particle beam comprises neutral hydrogen atoms.

4. The system of claim 3 wherein the spectral lines are Balmer lines.

5. The system of claim 3 wherein the spectral lines are Lyman lines.

6. The system of claim 1 wherein the system further comprises an additional subsystem comprising second passive collecting means, second means for combining the spectral lines, and second means to deflect the beam, such that the subsystem is rotated 90 degrees about the fiducial axis relative to the system described in claim 1.

7. The system of claim 1 wherein the means for passively sensing comprises a high resolution spectrometer.

8. A system for determining the velocity of a relativistic neutral particle beam comprising:
    means to produce a relativistic neutral particle beam, said means having a fiducial axis;
    means for passively sensing the spectral lines from the spontaneous emission of photons from excited particles at a plurality of diametrically opposed positions surrounding the fiducial axis of the generating means wherein the axis of a sensing position is at right angles to the fiducial axis;
    means for dithering the actual path of the beam until it is coincident with the fiducial axis as evidenced by the achievement of coincidence of the spectral lines from diametrically opposed pairs of sensors; and
    means to calculate the velocity of the beam based upon the special relativistic Doppler formula.

9. A system for determining the direction of a neutral particle beam relative to the system fiducial axis comprising:
    means to collect photons emitted from the relaxation of excited particles in the beam;
    means to limit the collection of the photons to at least one predetermined angle relative to the system fiducial axis;
    means to guide the collected photons to wavelength measurement means;
    means to detect the output of the wavelength measurement means; and,
    means to calculate the direction of the beam as a function of the detected output.

10. The system of claim 9 wherein the wavelength detection means comprises a precision spectrometer.

11. The system of claim 9 wherein the means to detect comprises a solid state detector means having a multiplicity of pixels which individually register the detected output falling thereupon from which position on the detector and intensity may be determined.

12. The system of claim 9 wherein the at least one predetermined angle comprises the Doppler free angle in the system frame.

13. The system of claim 12 wherein the at least one predetermined angle additionally comprises the angle normal to the fiducial axis.

14. The system of claim 12 wherein the at least one predetermined angle additionally comprises the unshifted angle.

15. A neutral particle beam velocity vector measurement system comprising:
    reflective optical means arrayed about the beam to collect and reflect photon emitted by the relaxation of excited particles in the beam at two predetermined angles relative to a system fiducial angle;
    slit means through which the transmitted photons from the reflective optical means must pass;
    wavelength measurements means onto which at least a portion of the transmitted photons fall after passing through the slit means;
    detector means which receive the output of the wavelength measurement means; and
    means to calculate the direction and magnitude of the velocity vector as a function of the detected wavelength measurements.

16. The system of claim 15 wherein one of the predetermined angles is the Doppler free angle in the system frame.

17. The system of claim 16 wherein the other of the predetermined angles is the angle normal to the fiducial axis.

18. The system of claim 16 wherein the other of the predetermined angles is the unshifted angle.

19. The system of claim 15 wherein the wavelength comprises a precision spectrometer.

20. The system of claim 15 wherein the detector means comprises a solid state detector means having a multiplicity of pixels which individually register the detected output falling thereupon from which position on the detector and intensity may be determined.

* * * * *